A. R. VAN HORN.
AUTOMATIC ELECTRIC GENERATING SYSTEM.
APPLICATION FILED DEC. 27, 1912.
1,202,622.
Patented Oct. 24, 1916.
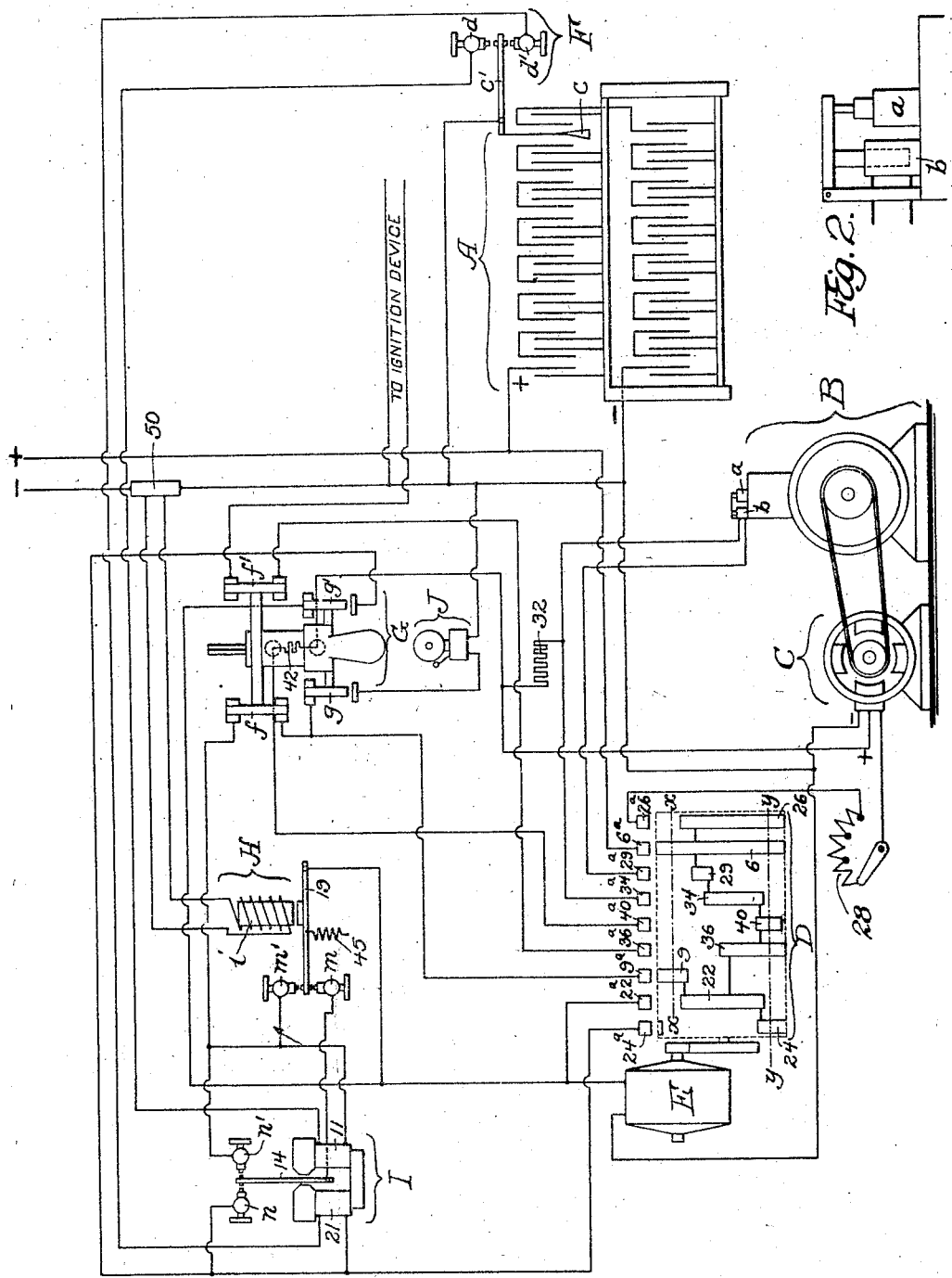
WITNESSES
INVENTOR
ALFRED R. VAN HORN
BY HIS ATTORNEY

UNITED STATES PATENT OFFICE.

ALFRED R. VAN HORN, OF PHILADELPHIA, PENNSYLVANIA.

AUTOMATIC ELECTRIC GENERATING SYSTEM.

1,202,622.

Specification of Letters Patent. Patented Oct. 24, 1916.

Application filed December 27, 1912. Serial No. 738,851.

*To all whom it may concern:*

Be it known that I, ALFRED R. VAN HORN, a citizen of the United States, residing in Philadelphia, Pennsylvania, have invented certain Improvements in Automatic Electric Generating Systems, of which the following is a specification.

The object of my invention is to provide an electric current generating and distribution system which will be completely automatic in its operation so long as the engine is supplied with fuel and the operative conditions are normal, an abnormal condition at once causing the sounding of an alarm which will continue to sound until the proper steps have been taken to remedy such abnormal condition.

With this object in view I have devised a novel combination of apparatus comprising an internal combustion engine, a dynamo-electric machine, a storage battery, and certain electrical connections and appurtenances whereby the engine is started whenever the storage battery has been discharged to the predetermined extent as determined by the specific gravity of its electrolyte, the engine then operating the dynamo as a generator and causing it to recharge the storage battery until said charge has been carried to a predetermined point as indicated by the increased specific gravity of the electrolyte, whereupon the engine is automatically stopped until, by the use of current from the battery, its specific gravity has again fallen to the predetermined point, whereupon the engine is again automatically started and the battery recharged. The apparatus also provides against overcharging the battery and takes care of any overload on the line which would ordinarily permit an excessive current flow from the battery. The apparatus is also so designed as to require a minimum amount of current for starting the engine by reason of the fact that it provides automatic compression-relieving means for the engine during the cranking operation.

In the accompanying drawing—Figure 1 illustrates, in diagrammatic form, apparatus constructed in accordance with my invention, and Fig. 2 is an enlarged view of part of the motive power engine constituting an element of said apparatus.

In the drawing, A represents an electric storage battery of suitable capacity to supply current to a line whose wires are marked, respectively, + and —, this line supplying current to any desired apparatus, such, for instance, as a series of lights. An internal combustion engine B of any suitable type, preferably one using a liquid hydrocarbon fuel, is connected to a dynamo C, said engine and dynamo being of sufficient capacity to charge the battery A at the proper rate while also supplying current to the line and having in addition enough reserve capacity to properly handle any overload within predetermined limits independently of the battery.

For governing the operation of the apparatus I provide a controller D, preferably of the drum type, the various contacts on this drum being represented in extended form in Fig. 1, of the drawing. The drum is rotated by a small electric motor E designed to be operated by current either from the battery A or from an auxiliary storage battery. The engine B is provided with a compression releasing valve $a$ (Fig. 2) whose movable element is connected to the core of a solenoid $b$ in such manner that when the latter is energized the valve is opened and relieves the compression of the engine. The battery A has in one of its cells a hydrometer $c$ operatively connected in any suitable way to the lever $c'$ of a switch F, the arrangement being such that so long as the specific gravity of the electrolyte of the battery is above a predetermined limit current will be directed through the contact $d'$ of the switch, and when the specific gravity of the electrolyte falls below a predetermined limit the lever $c'$ will be moved and current will be directed through the contact $d$ of the switch.

The apparatus also includes a reverse current circuit breaker G, a load relay H, a polarized relay I and an electro-magnetically operated alarm bell J, the circuit breaker G being so constructed that the circuit through the switches $f$, $f'$ will be closed and the circuit through the switches $g$, $g'$ will be opened when the circuit is closed, and these conditions will be reversed when the circuit breaker is open.

The load relay H comprises an electro-magnetic coil $i$ whose armature coöperates with contacts $m$, $m'$, and the armature of the polarized relay I coöperates with contacts $n$, $n'$. The controller drum D is provided with nine separate contacts numbered, respectively, 6, 9, 22, 24, 26, 29, 34, 36 and 40, all of these contacts being electrically connected and coöperating with the corresponding terminals $6^a$, $9^a$, $22^a$, $24^a$, $26^a$, $29^a$, $34^a$, $36^a$ and $40^a$ of various circuits of the electrical system of the apparatus. The contact 6 of the drum is always in engagement with the terminal $6^a$ but the other contacts, as the drum is moved, engage with and are disengaged from their respective circuit terminals.

In connection with the dynamo C is employed a rheostat 28 and a starting resistance 32.

Having thus described in a general way the different members of the apparatus which I employ I will now proceed to describe the operation of the apparatus under varying conditions.

Assuming, in the first place, that the current for the line is being supplied by the storage battery A and that the engine B and dynamo C are not in operation, and the drum D is in such position that the line $x$—$x$ (Fig. 1) corresponds with the line of circuit terminals so that only the contacts 6 and 9 are in engagement with their respective circuit terminals, this condition of affairs continues until the specific gravity of the electrolyte in the storage battery is so lowered that the bulb of the hydrometer $c$ falls and thereby causes the lever $c'$ to close the circuit through the contact $d$ of the switch F. This will establish a circuit from the positive pole of the battery A through the terminal $6^a$, drum contacts 6 and 9, terminal $9^a$, switch $f$ of circuit breaker G, to coil 11 of the polarized relay I and thence through the contact $d$ of the switch F and through the lever $c'$ to the negative pole of the battery. This causes the armature 14 of the polarized relay I to move to the right, thus establishing a circuit from the positive pole of the battery through terminal $6^a$, drum contacts 6 and 9, terminal $9^a$, switch $f$, contact $n'$ of the polarized relay I, armature 14, contact $m$ and armature 19 of the load relay H, to motor E and thence to negative pole of the battery. The motor E is thus caused to rotate and thereby move the drum from the starting position, indicated by the line $x$—$x$, in Fig. 1. When the drum contact 9 and terminal $9^a$ are disengaged the circuit through the coil 11 of the polarized relay I is broken but this being a polarized relay the armature 14 will retain its former position and still close the circuit through the contact $n'$ until the coil 21 of the relay has been energized. The drum continuing to turn, the contact 22 engages the terminal $22^a$ before contact 9 and terminal $9^a$ are disengaged. The circuit is now established from the positive pole of the battery through terminal $6^a$, drum contacts 6 and 22, terminal $22^a$ to motor E, and thence to the negative pole of the battery. When the drum D has completed so much of its rotating movement as to disengage the contact 22 and terminal $22^a$, the circuit through the motor E is broken and the further rotative movement of the drum D is arrested, the drum contact 24 being now in engagement with the terminal $24^a$ and the drum occupying in respect to the line of terminals the position indicated by the line $y$—$y$, Fig. 1. During the time that the drum is moving from the position indicated by the line $x$—$x$ to that indicated by the line $y$—$y$, electric circuits other than those previously described are established; thus when the drum contact 26 engages the terminal $26^a$ circuit is established from the positive pole of the battery through terminal $6^a$, drum contacts 6 and 26, terminal $26^a$, and rheostat 28 to the field coil of the shunt-wound dynamo C, and thence to the negative pole of the battery. The drum D continuing to revolve its contact 29 engages the terminal $29^a$. This establishes another circuit from the positive pole of the battery through the terminal $6^a$, drum contacts 6 and 29, and terminal $29^a$, to the solenoid $b$ of the compression releasing mechanism of the engine B, and thence through the starting resistance 32 and to the positive side of the armature of the dynamo C and through the armature to the negative pole of the battery. The field coils are therefore excited and the counter-electro motive force of the coils is generated before the armature receives its current. The dynamo will therefore run as a motor and being mechanically connected to the engine B will rotate the crank shaft of the latter and will start the engine in the same manner as though it had been "cranked" by hand. At this time the compression on the engine is released because the solenoid $b$ has opened the compression release valve $a$.

Continued movement of the drum D brings its contact 34 into engagement with the terminal $34^a$, thereby short-circuiting the solenoid $b$, the circuit in which said solenoid was formerly included now running from the positive pole of the battery through the terminal $6^a$, drum contacts 6 and 34, terminal $34^a$, starting resistance 32, and armature of the dynamo C to the negative pole of the battery. The result of the short-circuiting of the solenoid $b$ is to close the valve $a$ and the compression stroke of the engine is thus established, but as the dynamo C, running as a motor, has brought the engine B up to a certain speed the momentum of the fly wheel carries the piston past the compression stroke, which relieves the torque upon the armature shaft. The drum contact 36 now engages with the terminal 36ª and thus completes a circuit from the positive pole of the battery through the terminal 6ª, drum contacts 6 and 36, terminal 36ª, switch $f'$ of the circuit breaker G and through the ignition circuit of the engine to the negative pole of the battery. The ignition circuit of the engine corresponds as to voltage with that of the storage battery, and the engine B is now in condition to operate in a normal manner and will serve as a motor for operating the dynamo C as a generator, the current flowing to the battery in a direction opposite to that in which it flowed from the battery when the latter was operating the dynamo as a motor. This current having a higher voltage than that of the battery will force its way back into the storage cells of said battery and effect the charging of the same. By this time the rotation of the controller drum D has brought the drum contact 40 into engagement with the terminal 40ª, and a circuit is thus established from the positive pole of the battery through the terminal 6ª, drum contacts 6 and 40, terminal 40ª, coil 42 of circuit breaker G, and armature of the dynamo to the negative pole of the storage battery. This cuts out the starting resistance 32. Continued rotation of the drum D now removes the drum contact 22 from engagement with the terminal 22ª and engages the drum contact 24 with the terminal 24ª, drum contacts 36, 40, 6 and 26 still remaining in engagement with their respective terminals. A circuit will now be established from the positive side of the generator C to coil 42 of circuit breaker G, thence to terminal 40ª, drum contacts 40 and 6, and terminal 6ª to the positive pole of the battery A, then through the cells of said battery to the negative pole of the same, and thence to the negative pole of the generator, thus charging the cells of the battery, the generator also at this time supplying current for the line. When the cells of the battery become charged, the specific gravity of the electrolyte will rise and the bulb of the hydrometer $c$ will also rise, thus actuating the lever $c'$ to close the circuit through the contact $d'$ of the switch F. This establishes a circuit from the positive pole of the generator to the coil 42 of circuit breaker G, terminal 40ª, drum contacts 40 and 24, terminal 24ª, coil 21 of polarized relay I, contact $d'$ of switch F, and lever $c'$ to the negative pole of the generator C. The armature 14 of the polarized relay I will now move to the left completing the circuit from the positive pole of the generator, through coil 42 of the circuit breaker G, terminal 40ª, drum contacts 40 and 24, terminal 24ª, contact $n$ of the polarized relay and armature 14 thereof, contact $m$ and armature 19 of the load relay H to the motor E, and thence to the negative side of the generator. The drum D continues to revolve until the circuit through the motor E is broken by the movement of the drum contact 24 out of engagement with the terminal 24ª, this also breaking the circuit through the coil 21 of the polarized relay I. Preceding this operation the drum contact 40 was moved out of engagement with its terminal 40ª and the drum contact 26 was afterward moved out of contact with its terminal 26ª, thus successively breaking the circuits first through the armature and then through the field of the dynamo. When the circuit through the drum contact 40 is broken the motor E will take its current from the positive pole of the battery through the terminal 6ª, drum contacts 6 and 24, terminal 24ª, contact $n$ of the polarized relay, armature 14 of the same, contact $m$ and armature 19 of the load relay, and motor E to the negative pole of the battery. When the drum contact 24 has passed out of engagement with the terminal 24ª the motor E will stop, leaving the drum contacts 6 and 9 in engagement with their respective terminals 6ª and 9ª as at the beginning of the operation.

The ignition circuit of the engine B will be broken when the drum contact 36 passes out of engagement with the terminal 36ª and the operation of the engine and also of the dynamo C acting as a generator will be arrested, the cells of the battery being now recharged and supplying current to the line. Under these circumstances the armature 14 of the polarized relay I bears upon the contact $n$ of the same and the armature 19 of the load relay H still bears upon the contact $m$ of the same, current being shunted from the line to the electro-magnet $i$ of said load relay from a point 50, but not being strong enough to cause said electro-magnet to overcome the counter pull of the spring 45, on the armature 19. If the load on the line is increased beyond a predetermined point the pull of the electro-magnet $i$ overcomes the tension of the spring 45 and moves the armature 19 so as to cause it to make connection with the contact $m'$ of the relay, thus completing a circuit from the positive pole of the battery through the terminal 6ª, drum contacts 6 and 9, terminal 9ª, switch $f$ of the circuit breaker, contact $m'$, armature 19 and motor E to the negative pole of the battery. This starts the rotation of the drum D which goes through the function of starting the engine B as before described, and the engine B runs the dynamo C as a generator, which supplies current to the line in order to take care of the overload. The drum D continues to revolve until it reaches the position indicated by the line $y—y$, leaving the drum contacts 24, 36, 40, 6 and 26 in engagement with their respective terminals. The parts remain in this position until the load on the line is decreased beyond a predetermined point, when the spring 45 overcomes the pull of the electromagnet *i* and draws the armature 19 against the contact *m*, thus establishing a circuit from the positive pole of the generator C through the coil 42 of the circuit breaker G to the terminal 40ª, drum contacts 40 and 24, terminal 24ª, contact *n*, armature 14, contact *m*, armature 19 and motor E to the negative pole of the generator C. This will cause the motor E to rotate the drum until it has reached the position in respect to the line of terminals indicated by the line *x—x*, in Fig. 1, thus repeating the function of stopping the engine and generator as in the case first described.

The circuit breaker G has a reversal feature, that is to say, if a current beyond a certain strength flows through the coil 42 in a direction opposite to that taken by it when the generator is supplying current said circuit breaker is caused to open. When the engine is running and operating the dynamo C as a generator and the latter is furnishing current to the battery or the line, or both, the drum D occupies the position in respect to the line of terminals indicated by the line *y—y*, in Fig. 1, the drum contacts 24 and 36, 40, 6 and 26 being in engagement with their terminals. If, under these circumstances, the engine ceases to operate because of the lack of fuel, the dynamo instead of being operated as a generator now operates as a motor, a circuit being established from the positive pole of the battery through the terminal 6ª, drum contacts 6 and 40, terminal 40ª, coil 42 of circuit breaker G to the positive pole of the dynamo C and thence from the negative pole of the same to the negative pole of the battery. The dynamo now running as a motor attempts to run the engine B but because of the reverse current through the coil 42 the circuit breaker G opens, thereby opening the switches *f* and *f'* and closing the switches *g*, *g'*, the opening of the circuit breaker causing the dynamo circuit to be broken. The closing of the switch *g'* establishes a circuit from the positive pole of the battery through the terminals 6ª, drum contacts 6 and 24, terminal 24ª, switch *g'* and motor E to the negative pole of the battery A, thus causing the motor to rotate the drum D back to the starting position indicated by the line *x—x*, in Fig. 1, the circuit being now established from the positive pole of the battery through the terminal 6ª, drum contacts 6 and 9, terminal 9ª, switch *g*, electro-magnet of the alarm bell J, and negative side of the line back to the negative pole of the battery, the alarm continuing to ring until the engine defect has been remedied and the circuit breaker G again closed. If the ignition circuit is broken or faulty, or if the engine fails to start from any other cause there will be a repetition of the conditions last described.

If there is a breakage of the belt or other mechanical connection between the engine and dynamo the conditions will be the same as those last described, except that the dynamo will be running free as a motor and the engine will also be running free the reverse current through the dynamo causing the circuit breaker to open in the same manner as before. Apparatus constructed in accordance with my invention will therefore automatically take care of all of the conditions likely to be met with in the orderly operation of the apparatus so that if the engine is in proper running condition the apparatus needs no attention except the supply of gasolene at necessary intervals, and if there is any abnormal condition in the operation of the apparatus, such for instance as the failure of the spark in the engine, or the breaking of the connection between the engine and the dynamo an alarm will be at once sounded and kept up until such abnormal conditions have been corrected; consequently my invention supplies the need which has long been felt for an electric generating apparatus for country houses, farms, or remote communities where the trouble and expense of constant attendance during the night has heretofore prevented the installation of electric generating apparatus on a small scale.

In my improved electric generating apparatus the operations of starting and stopping the charging of the battery are dependent upon the specific gravity of the electrolyte in said battery, a means which in practice I have found to be most reliable for the purpose.

I claim:

1. The combination, in an automatic electric generation and storage system, of a motor, a dynamo driven thereby, a storage battery in circuit therewith, a controller drum, a driving motor therefor, two circuits controlled by said drum, one of said circuits containing said drum-driving motor and the other containing a magnet for operating a switch in said drum motor circuit.

2. The combination, in an automatic electric generation and storage system, of a motor, a dynamo in connection therewith, a storage battery in circuit with said dynamo, and an electric circuit energized by said battery, a circuit controlled by a hydrometer in said battery and also containing a polarized relay, a controller drum for said circuits, a motor for driving said drum, and a circuit containing said motor controlled by said polarized relay.

3. The combination, in an automatic electric generation and storage system, of a motor, a dynamo in connection therewith, a storage battery in circuit with said dynamo, and means whereby the dynamo is operated either by the engine as a generator or by the battery as a motor, said means including an electrical circuit containing a circuit breaker having an electric coil, said circuit breaker being held in a closed position when the current is traveling in one direction through the coil and being opened automatically when the direction of flow of the current is reversed.

In testimony whereof, I have signed my name to this specification, in the presence of two subscribing witnesses.

ALFRED R. VAN HORN.

Witnesses:
KATE A. BEADLE,
HAMILTON D. TURNER.